US 6,764,666 B2

(12) United States Patent
Mori

(10) Patent No.: US 6,764,666 B2
(45) Date of Patent: Jul. 20, 2004

(54) PROCESS FOR TREATING GAS CONTAINING FLUORINE-CONTAINING COMPOUNDS AND CO

(75) Inventor: Yoichi Mori, Chigasaki (JP)

(73) Assignee: Ebara Corporation, Tokyo (JP)

( * ) Notice: Subject to any disclaimer, the term of this patent is extended or adjusted under 35 U.S.C. 154(b) by 273 days.

(21) Appl. No.: 10/060,224

(22) Filed: Feb. 1, 2002

(65) Prior Publication Data

US 2002/0150517 A1 Oct. 17, 2002

(30) Foreign Application Priority Data

Feb. 2, 2001 (JP) ........................................ 2001-026750

(51) Int. Cl.$^7$ .......................... B01J 21/04; B01D 53/62; B01D 53/68; B01D 53/70
(52) U.S. Cl. ................... 423/240 S; 423/246; 588/206; 588/248
(58) Field of Search .............................. 423/210, 240 R, 423/240 S, 246; 588/206, 207, 248

(56) References Cited

U.S. PATENT DOCUMENTS

| | | | | |
|---|---|---|---|---|
| 5,059,405 A | * | 10/1991 | Watson et al. | ............... 423/210 |
| 5,238,656 A | | 8/1993 | Tajima et al. | ........... 423/240 R |
| 6,602,480 B1 | * | 8/2003 | Mori | ..................... 423/240 S |
| 6,630,421 B1 | * | 10/2003 | Atobe et al. | ................ 502/340 |
| 2004/0047786 A1 | * | 3/2004 | Kanno et al. | ............ 423/240 S |

FOREIGN PATENT DOCUMENTS

| | | |
|---|---|---|
| DE | 43 18 444 | 12/1994 |
| EP | 0 885 648 | 12/1998 |
| JP | 11-70322 | 3/1999 |
| JP | 2001-137659 | 5/2001 |
| JP | 2001-293335 | 10/2001 |
| WO | WO 00/09258 | 2/2000 |
| WO | WO 01/76725 | 10/2001 |

OTHER PUBLICATIONS

Patent Abstracts of Japan, JP 10–192653, Jul. 28, 1998.
Patent Abstracts of Japan, JP 10–286432, Oct. 27, 1998.
K. Mizuno, et al., Global Environment and Energy Issues Proceedings, pp. 293–294, "Catalytic Decomposition of Chlorofluorocarbons", Nov. 19–21, 1990.

* cited by examiner

*Primary Examiner*—Ngoc-Yen Nguyen
(74) *Attorney, Agent, or Firm*—Oblon, Spivak, McClelland, Maier & Neustadt, P.C.

(57) ABSTRACT

The purpose of the present invention is to provide a process and an apparatus for efficiently treating a gas containing fluorine-containing compounds and CO to be discharged, for example, from the step of dry cleaning the inner surfaces and the like of a semiconductor manufacturing apparatus or the step of etching various types of formed films such as oxide films in the semiconductor industry. In order to accomplish the above-mentioned purpose, the gas treating process according to the present invention is a process for treating a gas containing fluorine-containing compounds and CO which comprises contacting the above described gas with $O_2$ and $H_2O$ at a temperature of 850° C. or higher to oxidize the CO to $CO_2$; and then contacting the gas with γ-alumina at a temperature of 600 to 900° C. to decompose the fluorine-containing compounds.

2 Claims, 1 Drawing Sheet

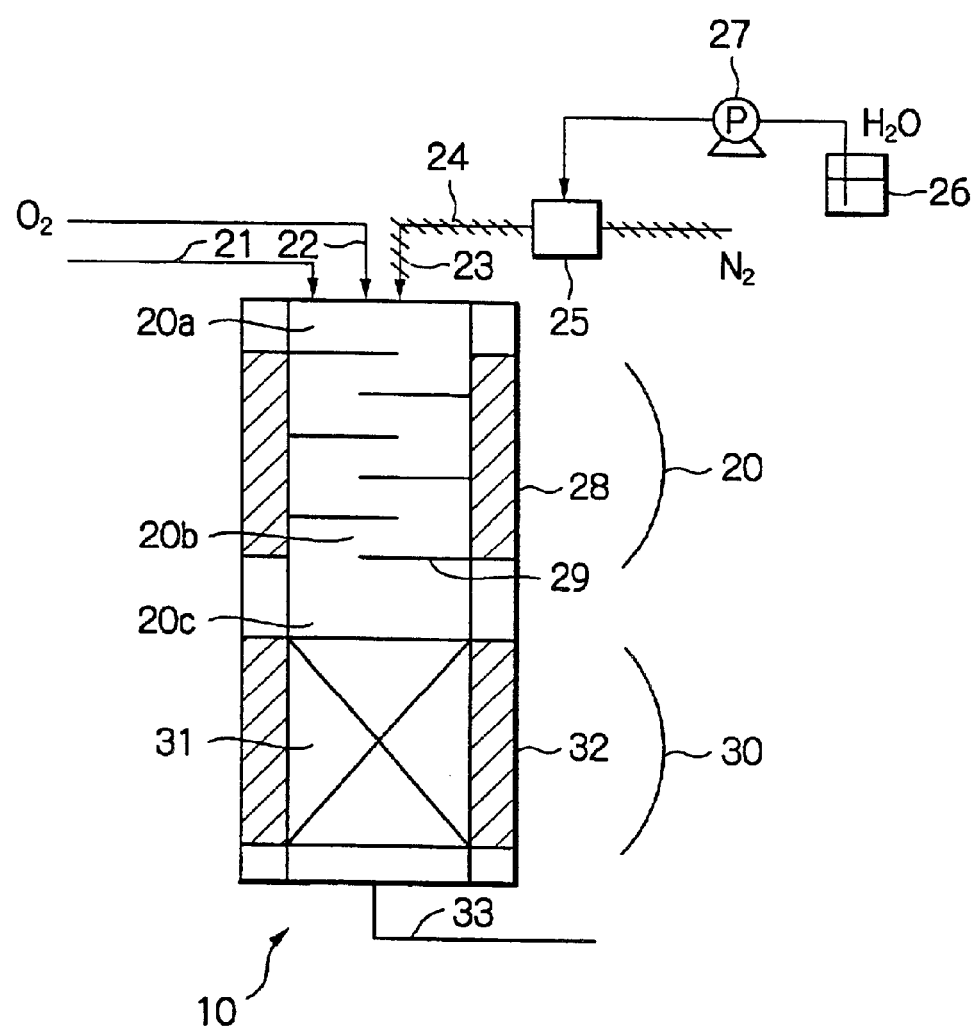

PROCESS FOR TREATING GAS CONTAINING FLUORINE-CONTAINING COMPOUNDS AND CO

BACKGROUND OF THE INVENTION

The present invention relates to a process for treating a gas containing fluorine-containing compounds and CO, and particularly it relates to a process and an apparatus for efficiently treating an exhaust gas containing fluorine-containing compounds and CO which are discharged in the step of dry cleaning the inner surfaces and the like of a semiconductor manufacturing apparatus, the step of etching various types of formed films such as oxide films and the like in the semiconductor industry.

In the semiconductor industry, various types of harmful gases are being used in the semiconductor manufacturing steps and the environmental pollution by discharging them to the environment is a matter of concern. Particularly, in an etching step, a CVD step and the like in the semiconductor industry, fluorinated hydrocarbons such as $CHF_3$ and fluorine-containing compounds such as perfluoro-compounds including $CF_4$, $C_2F_6$, $C_3F_8$, $C_4F_8$, $C_5F_8$, $SF_6$ and $NF_3$ (hereinafter referred to as "PFC") are being used. It is of urgent necessity to establish a system of removing the fluorine-containing compounds present in the exhaust gas from these steps as the global warming gases. Further, the exhaust gas from these steps sometimes contains CO as the processing gas or frequently contains CO which has been generated by exposing a mixed gas of PFC with $O_2$ to a plasma in a chamber.

As the method of removing PFC in a gas, a gas treating method using an alumina based catalyst obtained by incorporating various metals into alumina; a gas treating method using alumina having an Na content as the metal of not greater than 0.1% by weight; a gas treating method comprising contacting a molecular oxygen with a gas in the presence of alumina; a gas treating method using an aluminum-containing catalyst in the presence of steam at a temperature of 200 to 800° C.; a gas treating method using various types of metal catalyst in the presence of a molecular oxygen and water; and the like have been proposed. Furthermore, as described in the specification of Japanese Patent Application No. 2000-110668, a gas treating method using γ-alumina having a specific crystal structure (which exhibits diffraction lines having an intensity of 100 or more at the five angles of 33°±1°, 37°±1°, 40°±1°, 46°±1° and 67°±1° of the angles of diffraction 2θ measured by an X-ray diffraction apparatus) as the catalyst has been proposed.

On the other hand, as the method for removing CO in a gas, there is a method comprising oxidizing CO using a hopcalite oxidation catalyst (a composite oxide of Cu and Mn, an Ni oxide, and the like) and $O_2$ to $CO_2$ which is then removed. However, the technique of simultaneously treating fluorine-containing compounds and CO has not yet been reported.

Accordingly, in order to treat both fluorine-containing compounds and CO in a gas according to the conventional technique, it is necessary to adopt a method comprising forming a two-stage catalytic reaction vessel having a CO oxidation catalyst arranged in the previous stage and γ-alumina arranged in the later stage and passing a gas therethrough to oxidize CO in the previous stage and to decompose the fluorine-containing compounds in the latter stage. However, in this instance, there is a problem that the fluorine in the fluorine-containing compounds present in the gas comes to a catalytic poison against the CO oxidation catalyst to remarkably lower the CO oxidative power in the reaction vessel of the previous stage and as a result, the CO cannot be treated to a threshold limit value-time weighted average concentration (TLV-TWA value) of 25 ppm or smaller in a short period of time.

Furthermore, in order to treat a gas containing fluorine-containing compounds and CO according to the conventional technique, there are such problems that each component has to be treated with a different catalyst, which needs to use different heating vessels to be individually filled with different catalysts, and the treating temperature for each heating vessel has to be individually controlled, and further a wide space for installing the apparatuses is necessary, and the temperature control becomes complicated. Further, there is a problem of complicating the control of catalysts since the period of exchanging the catalyst differs due to the difference in the lives of individual catalysts. In addition, there is a problem of an increase in the running cost such as the expense necessary for periodically exchanging the catalysts.

Then, the object of the present invention is to solve the above described problems according to the conventional technique and to provide a process and an apparatus for treating a gas containing fluorine-containing compounds and CO which can simultaneously and efficiently treat fluorine-containing compounds and CO and are low in the running cost and can be simply controlled.

SUMMARY OF THE INVENTION

In order to solve the above described problems, the present inventors have made strenuous investigations, and found that the above described object can be achieved by first reacting a gas containing fluorine-containing compounds and CO with $O_2$ and $H_2O$ without using a CO treating catalyst at a specified temperature or higher to oxidize the CO to $CO_2$, and then contacting the gas with γ-alumina as the catalyst to decompose the fluorine-containing compounds, in treating the gas containing the fluorine-containing compounds and CO.

Namely, according to the present invention, there is provided a process for treating a gas containing fluorine-containing compounds and CO which comprises contacting the above described gas with $O_2$ and $H_2O$ at a temperature of 850° C. or higher to oxidize the CO to $CO_2$; and subsequently contacting the gas with γ-alumina heated at 600 to 900° C. to decompose the fluorine-containing compounds.

BRIEF DESCRIPTION OF THE DRAWINGS

FIG. 1 is a schematic perspective view showing one preferred embodiment of the apparatus for treating a gas containing fluorine-containing compounds and CO according to the present invention.

In FIG. 1, each referential numerals have the following meaning.

1: PFC exhaust gas treating apparatus;
20: heat oxidation vessel;
20b: oxidation reaction zone;
21: PFC exhaust gas inlet;
22: $O_2$ inlet;
23: $H_2O$ inlet;
28: ceramic heater;
29: baffles;
30: catalytic reaction vessel;

31: γ-alumina;
32: ceramic heater;

DETAILED DESCRIPTION OF THE INVENTION

The gas containing fluorine-containing compounds and CO which can be treated by the present invention may include exhaust gases which are discharged in the step of dry cleaning the inner surfaces of a semiconductor manufacturing apparatus and the step of etching various types of formed films in the semiconductor industry and the like. Further, the above described fluorine-containing compounds may include fluorinated hydrocarbons such as such $CHF_3$, perfluoro-compounds such as $CF_4$, $C_2F_6$, $C_3F_8$, $C_4F_8$, $C_5F_8$, $SF_6$ and $NF_3$ and the like.

In the present invention, the temperature at which the above described gas is contacted with $O_2$ and $H_2O$ is 850° C. or higher, preferably 870° C. or higher. When the temperature is lower than 850° C., the CO in the gas is not sufficiently oxidized and remains, and thus such temperatures are not preferred.

In the present invention, the gas containing fluorine-containing compounds and CO (hereinafter referred to as "PFC exhaust gas" for brevity) is first contacted with $O_2$ and $H_2O$ at the above described temperature to cause the reactions in the gas phase as shown by the following formulae, whereby CO is oxidized to $CO_2$.

$$2CO+O_2 \rightarrow 2CO_2$$

$$CO+H_2O \rightarrow CO_2+H_2$$

$$2H_2+O_2 \rightarrow 2H_2O$$

Subsequently, the gas is then contacted with γ-alumina at a temperature of 600 to 900° C., by which, the fluorine-containing compounds in the gas is decomposed. For example, when the gas contains $CF_4$ as the PFC, the $CF_4$ is decomposed to $CO_2$ and HF by the reaction as shown by the following formula.

$$CF_4+2H_2O \rightarrow CO_2+4HF$$

In the present invention, the amounts of $O_2$ and $H_2O$ to be contacted with a PFC exhaust gas are preferably sufficient to decompose all of CO and fluorine-containing compounds in the PFC exhaust gas to be treated to $CO_2$ and HF. In a preferred embodiment, the amount of $O_2$ to be added to the PFC exhaust gas is preferably at least molar amount necessary for the C atoms in the fluorine-containing compounds and the C atoms of CO which are present in the PFC exhaust gas to come to $CO_2$ (minimum molar amount), more preferably the amount of at least molar amount obtained by adding one mole to the minimum molar amount. Further, the amount of $H_2O$ to be added to the PFC exhaust gas is preferably at least molar amount necessary for the F atoms in the fluorine-containing compounds to come to HF (minimum molar amount), more preferably, the molar amount corresponding to 6 to 20 times of one mole of the fluorine-containing compounds. In this instance, $H_2O$ is preferably introduced in a gaseous state and, for example, $H_2O$ is sent from an $H_2O$ tank to a vaporizer by means of a pump and heated to 100° C. or higher to render the entire amount steam, and furthermore it is preferred to introduce an $H_2O$ with a pressure of an inert gas such as $N_2$.

In the present invention, the γ-alumina to be contacted with the PFC exhaust gas acts as a catalyst for decomposing fluorine-containing compounds. In the present invention, the contact of the PFC exhaust gas with γ-alumina is preferably conducted at a temperature of 600 to 900° C., preferably 650 to 850° C., more preferably 750° C. When the contact temperature of the PFC exhaust gas with the γ-alumina is lower than 600° C., the activity of the alumina as a catalyst is lowered to decrease the decomposition ratio of the PFC, and thus such temperatures are not suitable, and conversely temperatures of higher than 900° C. cause crystal transition and there is a fear of vitrifying the γ-alumina, and thus such temperatures are not suitable. It is preferred to heat the γ-alumina catalyst to the above described temperature by a heating means.

As the γ-alumina which can be used in the present invention, the γ-alumina having a crystal structure which exhibits diffraction lines having an intensity of 100 or more at five angles of 33°±1°, 37°±1°, 40°±1°, 46°±1° and 67°±1° of the angles of diffraction 2θ measured by an X-ray diffraction apparatus as proposed in Japanese Patent Application No. 2000-110668 can be preferably used. The $Na_2O$ content in the alumina is preferably not greater than 0.02% by weight based on the entire amount of the γ-alumina in consideration of the decomposition performance of the fluorine-containing compounds. The γ-alumina having such a crystal structure can be obtained, for example, by firing an alumina sol as the spherical alumina hydrogel [$Al(OH)_y \cdot nH_2O$]. Although the γ-alumina which is used in the present invention is not particularly limited in its shape as far as it has the above described crystal structure, it is preferably spherical from the standpoint of handling properties. Further, although the particle size of the γ-alumina may be within the range which does not increase a pressure drop when the gas to be treated is passed, it is preferably fine to increase the contact area with the gas components to be treated and is preferably in the range of 0.8 mm to 2.6 mm.

Further, according to the present invention, there is provided an apparatus for treating a gas containing fluorine-containing compounds and CO. The apparatus for treating a gas containing fluorine-containing compounds and CO comprises a heat oxidation vessel having a hollow inside enabling the passage of the above described gas therethrough, a heating means capable of heating the temperature of the gas in the above described hollow inside to 850° C. or higher, a gas inlet, an $O_2$ inlet and an $H_2O$ inlet; and a catalytic reaction vessel which is under fluid-communicating condition with the above-described heat oxidation vessel and has been filled with γ-alumina.

In the PFC exhaust gas treating apparatus of the present invention, the heat oxidation vessel and the catalytic reaction vessel may be arranged under fluid-communicating condition, and they may be formed as one body or as separate bodies. Further, although the material of the heat oxidation vessel and the catalytic reaction vessel is not particularly limited, it is preferably formed of a material which is stable in a high temperature atmosphere and inert to the gas components to be treated and, simultaneously, excels in thermal conductivity, and particularly preferably formed of stainless steel.

In the PFC exhaust gas treating apparatus of the present invention, a heating means of the heat oxidation vessel is not particularly limited as far as it can heat the gas phase portion formed in the hollow inside of the heat oxidation vessel to 850° C. or higher, preferably to 870° C. or higher and, for example, a ceramic heater such as a ceramic electric tubular furnace is preferably arranged on the outside of the heat oxidation vessel.

In the heat oxidation vessel of the PFC exhaust gas treating apparatus of the present invention, at least a PFC exhaust gas inlet, an $O_2$ inlet and an $H_2O$ inlet are provided. These inlets are preferably provided at the top portion of the heat oxidation vessel, and each is connected to a PFC exhaust gas generation source such as an exhaust gas line from a semiconductor manufacturing apparatus, an $O_2$ supply source, or an $H_2O$ supply source through piping. It is preferred to introduce $H_2O$ in a gaseous form, and thus in a preferred embodiment, the $H_2O$ supply line to be connected to the $H_2O$ inlet is constituted of an $H_2O$ (liquid) tank of the $H_2O$ supply source, a vaporizer which vaporizes the liquid $H_2O$ to be supplied from the $H_2O$ tank, a piping which connects the tank with the vaporizer, a water pump provided on the piping, and a supply source of an inert gas such as $N_2$ for pumping the vaporized $H_2O$ to the $H_2O$ inlet of the heat oxidation vessel, and a heating means such as a band heater is installed on the piping connected to the $H_2O$ inlet.

Further, it is preferred to install a contact auxiliary means to enhance the contact efficiency of the CO in the gas with $O_2$ and $H_2O$ in the inside of the heat oxidation vessel. The contact auxiliary means is not particularly limited as far as it can cause a turbulence in the gas phase portion to be formed in the hollow inside of the heat oxidation vessel and may include, for example, baffles formed by arranging a plurality of plates, fins or the like on the inner wall of the heat oxidation vessel spirally or alternately so as to face one another in the radial direction, fillers having a small pressure loss and the like. In the case of using baffles as the contact auxiliary means, the surfaces of the baffles may be coated with a metal such as Ni.

The catalytic reaction vessel of the PFC exhaust gas treating apparatus of the present invention is filled with γ-alumina. The volume of the catalytic reaction vessel is not particularly limited as far as it can be filled with γ-alumina. As the γ-alumina to be filled in the catalytic reaction vessel, the γ-alumina having the above described specified crystal structure can preferably be used.

Further, in a preferred embodiment, the catalytic reaction vessel is provided with a heating means to heat γ-alumina to 600 to 900° C., preferably 650 to 850° C., more preferably 750° C. This heating means is not particularly limited and the same heating means as provided in the heat oxidation vessel can be used, and the heating means as described above in connection with the heat oxidation vessel can be preferably be used.

Moreover, if necessary or required, the PFC exhaust gas treating apparatus of the present invention may be combined with an apparatus for separating solid substances such as a water splaying tower to separate solid substances which might be present in the gas, or an apparatus for removing an acid gas such as a water splaying tower to remove an acid gas such as HF to be obtained after the PFC exhaust gas treatment of the present invention.

With reference to the FIGURE attached hereto, the PFC exhaust gas treating apparatus of the present invention will now be explained in more detail but the present invention should not be limited thereto. In the following description, in order to simplify the explanation, fluorine-containing compounds are supposed to be perfluoro-compounds such as $CF_4$ and abbreviated to merely "PFC" for explanation.

FIG. 1 is a schematic view showing one preferred embodiment of the PFC exhaust gas treating apparatus of the present invention. The PFC exhaust gas treating apparatus of the present invention 10 has a heat oxidation vessel 20 which allows a PFC exhaust gas to contact with $O_2$ and $H_2O$ at a temperature of 850° C. or higher to effect oxidation treatment of CO in the gas, and a catalytic reaction vessel 30 which allows the oxidation treated gas to contact with γ-alumina at a temperature of 600 to 900° C. to decompose the PFC in the gas. The heat oxidation vessel 20 and the catalytic reaction vessel 30 are arranged in such a fluid-communicating condition that the PFC exhaust gas flows down from the heat oxidation vessel 20 arranged at the upper stage to the catalytic reaction vessel 30 arranged at the lower stage. In the present embodiment, the heat oxidation vessel 20 and the catalytic reaction vessel 30 comprise cylindrical stainless steel mini-columns having the same size.

At the top portion 20a of the heat oxidation vessel 20, a gas inlet 21, an $O_2$ inlet 22 and an $H_2O$ inlet 23 are provided. The gas inlet 21 is connected to a PFC exhaust gas supply source (not shown in the FIGURE) such as an exhaust gas line of a semiconductor manufacturing apparatus through piping. The $O_2$ inlet 22 is connected to an $O_2$ supply source (not shown in the FIGURE) through piping. The $H_2O$ inlet 23 is connected to a vaporizer 25 through piping 24 wrapped with a band heater, and the vaporizer 25 is connected to an $H_2O$ (liquid) tank 26 through piping on which a water pump 27 is installed. In addition, the vaporizer 25 is connected to an inert gas ($N_2$) supply source through piping.

The inside of the heat oxidation vessel 20 is rendered hollow, and the hollow inside has an oxidation reaction zone 20b into which an PFC exhaust gas, $O_2$ and $H_2O$ are introduced to advance the oxidation reaction of CO. The oxidation reaction zone 20b has a plurality of baffles 29 as the contact auxiliary means to enhance the contact efficiency of CO in the PFC exhaust gas with $O_2$ and $H_2O$. The baffles 29 are plates or fins having a size slightly longer than the inner radius of the heat oxidation vessel 20 and are spirally arranged on the inner wall of the heat oxidation vessel 20 or are alternately arranged on the inner wall of the heat oxidation vessel 20 so as to face one another in the radial direction. At the outer periphery of the heat oxidation vessel 20, a ceramic electric tubular furnace 28 is provided as the heating means capable of heating the temperature of the oxidation reaction zone 20b to 850° C. or higher. Further, in order to measure the temperature of the oxidation reaction zone, a thermocouple (not shown in the Figure) is provided at the center of the hollow inside of the heat oxidation vessel.

Downstream of the heat oxidation vessel 20, a catalytic reaction vessel 30 is provided in a fluid-communicating condition with the heat oxidation vessel 20. The inside of the catalytic reaction vessel 30 is filled with γ-alumina. The γ-alumina having the above described specific structure is preferably used.

Furthermore, at the outer periphery of the catalytic reaction vessel 30, a ceramic electric tubular furnace 32 is preferably provided as the heating means capable of heating the γ-alumina at 600 to 900° C. This ceramic electric tubular furnace 32 may be either integrated with or separated from the ceramic electric tubular furnace 28 provided for the heat oxidation vessel 20. Further, in order to measure the temperature of the inside of the catalytic reaction vessel 30, a thermocouple (not shown in the FIGURE) is installed in the inside of the catalytic reaction vessel 30.

EXAMPLES

The present invention will be more concretely explained below on the basis of examples.

Example 1

The relationship between the temperature of the gas phase portion in a heat oxidation vessel and the removal ratio of CO was observed as the CO treatment properties in a gas with no catalyst.

As the heat oxidation vessel, a stainless steal mini-column having an inner diameter of 27 mm and a height of 500 mm amounted in a ceramic electric tubular furnace was used. In order to measure the temperature of the gas phase portion in the hollow inside of the heat oxidation vessel, a thermo-couple was installed nearly at the center of the hollow inside of the heat oxidation vessel. The temperature was varied stepwise from 500 to 900° C. while monitoring the temperature of the gas phase portion with the thermocouple.

Carbon monoxide (CO) diluted with $N_2$ which was used as an artificial test exhaust gas, $O_2$ and $H_2O$ were introduced into the hollow inside of the heat oxidation vessel so as for the $O_2$ and $H_2O$ to come to at least equimolar amounts at a total gas flow rate of 410 sccm. At this instance, the concentration of the CO introduced was set at 1.22 to 1.33%; that of $O_2$ introduced was set at 3.7 to 3.9%; and the flow velocity of $H_2O$ was set at 0.079 mL/min. The treatment time was set at 30 minutes.

In order to observe the disposal performance in the heat oxidation vessel, CO, $CO_2$, $O_2$ and $H_2$ in the gas at the outlet of the column were analyzed using a gas chromatograph apparatus equipped with a mass detector ("AGS-7000U", manufactured by Anelva Co., Ltd.). The results are set forth in Table 1.

TABLE 1

| Treating Temperature (° C.) | Gas at Inlet | | | Gas at Outlet | | | | CO Removal Ratio (%) |
|---|---|---|---|---|---|---|---|---|
| | CO (%) | $O_2$ (%) | $H_2O$ (mL/ min) | CO (ppm) | $CO_2$ (ppm) | $O_2$ (%) | $H_2$ (ppm) | |
| 500 | 1.28 | 3.8 | 0.079 | 11200 | 470 | 3.8 | <2 | 13 |
| 600 | 1.22 | 3.9 | 0.079 | 9960 | 1470 | 3.8 | <2 | 18 |
| 700 | 1.23 | 3.8 | 0.079 | 7160 | 3600 | 3.6 | <2 | 42 |
| 750 | 1.27 | 3.8 | 0.079 | 3770 | 6310 | 3.4 | <2 | 70 |
| 800 | 1.23 | 3.8 | 0.079 | 500 | 10500 | 3.2 | <2 | 96 |
| 850 | 1.29 | 3.8 | 0.079 | 12 | 9470 | 3.2 | <2 | 99.9 |
| 870 | 1.28 | 3.7 | 0.079 | <2 | 11000 | 3.2 | <2 | 100 |
| 900 | 1.31 | 3.9 | 0.079 | <2 | 11300 | 2.9 | <2 | 100 |

As would be understood from Table 1, when the temperature of the gas phase portion of the heat oxidation vessel was 850° C., CO was reduced to 12 ppm (removal ratio of 99.9%) which was lower than the tolerance concentration (25 ppm), and when the temperature was 870° C., CO was reduced to lower than the detection limit (25 ppm). At this time, the $CO_2$ in the gas at the outlet (11000 ppm) was nearly equal to the concentration of the CO introduced and $H_2$ was not detected, and accordingly it can be considered that CO has all been oxidized to $CO_2$.

Comparative Example 1A

The same experiment as in Example 1 was carried out with the use of the apparatus of Example 1 by introducing CO at a concentration of 1.33% and $H_2O$ at a flow velocity of 0.079 mL/min at a total gas flow rate of 410 sccm into the inside of the heat oxidation vessel without the addition of $O_2$ at a temperature of the gas phase portion of the heat oxidation vessel of 870° C. for 30 minutes of the treating time. The results are set forth in Table 2.

As would be understood from Table 2, even when the temperature of the gas phase portion was 870° C., by the addition of $H_2O$ alone, the removal ratio of CO was merely 38%, and thus the disposal performance of CO was low.

Comparative Example 1B

The same experiment as in Example 1 was carried out with the use of the apparatus of Example 1 by introducing CO at a concentration of 1.24% and $O_2$ at a concentration of 3.8% at a total gas flow rate of 410 sccm without the addition of $H_2O$ at a temperature of the gas phase portion of the heat oxidation vessel of 870° C. for 30 minutes of the treating time. The results are set forth in Table 2.

As would be understood from Table 2, even when the temperature of the gas phase portion was 870° C., the addition of $O_2$ alone could not completely remove CO, and 200 ppm of CO which greatly exceeded the tolerance concentration (25 ppm) were detected in the gas at the outlet.

TABLE 2

| | Gas at Inlet | | | Gas at Outlet | | | | Removal Ratio of CO (%) |
|---|---|---|---|---|---|---|---|---|
| | CO (%) | $O_2$ (%) | $H_2O$ (mL/ min) | CO (ppm) | $CO_2$ (ppm) | $O_2$ (%) | $H_2$ (ppm) | |
| Example 1 (870° C.) | 1.28 | 3.7 | 0.079 | <2 | 11000 | 3.2 | <2 | 100 |
| Comparative Example 1A | 1.33 | 0 | 0.079 | 8330 | 3220 | <0.3 | <2 | 38 |
| Comparative Example 1B | 1.24 | 3.8 | 0 | 200 | 11600 | 3.1 | <2 | 98 |

Example 2

The disposal performance of the PFC exhaust gas treating apparatus according to the present invention was observed. As the PFC exhaust gas treating apparatus, an apparatus 10 having a structure shown in FIG. 1 was used. As the heat oxidation vessel 20 and the catalytic reaction vessel 30, stainless steel mini-columns having an inner diameter of 27 mm and a height of 500 mm were used. As the γ-alumina, "Neobead GB-08" (a product of Mizusawa Chemical Co., Ltd., $Na_2O$ content of not greater than 0.01% by weight) having a particle diameter of 0.8 mm and a crystal structure which exhibits diffraction lines having an intensity of 100 or more at five angles of 33°±1°, 37°±1°, 40°±1°, 46°±1° and 67°±1° of the angles of diffraction 2θ measured by an X-ray diffraction apparatus was filled in the catalytic reaction vessel 30 to a height of 100 mm (a filled amount of 57 mL). As the heating means for the heat oxidation reaction vessel 20 and the catalytic reaction vessel 30, ceramic electric tubular furnaces 28 and 32 were used. Within these furnaces, the heat oxidation reaction vessel 20 and the catalytic reaction vessel 30 were mounted. The temperatures of the oxidation reaction zone 20b in the heat oxidation vessel 20 and the inside of the catalytic reaction vessel 30 were measured by thermocouples (not shown in the Figure) installed at their center portion.

The temperature of the oxidation reaction zone 20b in the heat oxidation reaction vessel 20 was heated to 870° C. and that of γ-alumina in the catalytic reaction vessel 30 was heated to 750° C., and CO and $CF_4$ diluted with $N_2$ as an artificial test PFC exhaust gas and at least equimolar amounts of $CO_2$ an $O_2$ were introduced into the heat oxidation vessel 20 at a total gas flow rate of 410 sccm. The concentrations introduced were set at CO: 1.24%, $CF_4$: 1.61%, and $O_2$: 5.6%, respectively, and the flow velocity of $H_2O$ was set at 0.079 mL/min.

In order to confirm the disposal performance of the present apparatus, concentration of CO, $CF_4$, $CO_2$, $O_2$ and $H_2$ in the gas at the outlets of the heat oxidation vessel and the catalytic reaction vessel were analyzed by a gas chromatograph apparatus equipped with a mass detector ("AGS-7000U", manufactured by Anelva Co., Ltd.). The results are set forth in Table 3.

TABLE 3

| | Gas at Outlet | | | | |
|---|---|---|---|---|---|
| Sampling Point | CO (ppm) | $CF_4$ (ppm) | $CO_2$ (%) | $O_2$ (%) | $H_2$ (ppm) |
| At Outlet of Heat Oxidation Vessel | <1 | 15400 | 1.19 | 4.5 | <2 |
| At Outlet of Catalyst Reaction Vessel | <1 | <1 | 2.79 | 3.9 | 55 |

As would be clear from Table 3, at the outlet of the heat oxidation vessel, CO was disposed to lower than the detection limit (2 ppm) but $CF_4$ was not removed. At the outlet of the catalytic reaction vessel, both $CF_4$ and CO were disposed to lower than the detection limit (1 ppm for $CF_4$ and 2 ppm for CO). Accordingly, it has been confirmed that the present apparatus which combines a heat oxidation vessel with a catalytic reaction vessel has enabled good treatment of both CO and $CF_4$.

Comparative Example 2

In order to observe the effect of treating CO without passing a PFC exhaust gas through the heat oxidation vessel, an artificial test exhaust gas and $O_2$ and $H_2O$ were directly passed through the catalytic reaction vessel under the same conditions as in Example 2 excepting the heat oxidation vessel to carry out a comparative example. The results are set forth in Table 4.

TABLE 4

| | Gas at Outlet of Catalyst Reaction Vessel | | | | |
|---|---|---|---|---|---|
| | CO (ppm) | $CF_4$ (ppm) | $CO_2$ (%) | $O_2$ (%) | $H_2$ (ppm) |
| Example 2 | <1 | <1 | 2.79 | 3.9 | 55 |
| Comparative Example 2 | 3700 | <1 | 2.42 | 4.1 | 39 |

As would be clear from Table 4, although the disposal of $CF_4$ was possible only by the catalytic reaction vessel, CO removal ratio was as low as 70%, and CO could not be disposed to lower than the tolerance concentration.

From the above described Examples and Comparative Examples, it could be understood that the use of the gas treating apparatus according to the present invention which comprises a heat oxidation vessel and a γ-alumina-filled catalytic reaction vessel enables efficient treatment of a gas containing CO and fluorine-containing compounds.

According to the present invention, a gas containing fluorine-containing compounds and CO can be disposed to carry out oxidation of CO and decomposition of the fluorine-containing compounds efficiently and simultaneously, whereby the running cost becomes low and effective treatment becomes possible.

According to the present invention, treatment with each different catalyst, heating vessels to fill different catalysts, control of the treating temperature for each heating vessel and a wide space for installing apparatuses are not needed in treating a gas containing fluorine-containing compounds and CO, and the temperature control is rendered easy.

Further, since the use of different catalysts each having a different life is not required, the control of the catalyst is rendered easy. Furthermore, no specific catalyst for removing CO is necessary, and thus the running cost such as the expense in an periodical exchange of the catalyst can be lowered.

What is claimed is:

1. A process for treating a gas containing fluorine-containing compounds and CO which comprises contacting the above described gas with $O_2$ and $H_2O$ at a temperature of 850° C. or higher to oxidize the CO to $CO_2$; and then contacting the gas with γ-alumina at a temperature of 600–900° C. to decompose the fluorine-containing compounds.

2. The process of claim 1, wherein the γ-alumina has a crystal structure which exhibits diffraction lines having an intensity of 100 or more at five angles of 33°±1°, 37°±1°, 40°±1°, 46°±1° and 67°±1° of the angles of diffraction 2θ measured by an X-ray diffraction apparatus.

* * * * *